(12) United States Patent
Narayanaswamy et al.

(10) Patent No.: US 11,494,370 B2
(45) Date of Patent: Nov. 8, 2022

(54) HARDWARE-CONTROLLED UPDATING OF A PHYSICAL OPERATING PARAMETER FOR IN-FIELD FAULT DETECTION

(71) Applicant: NVIDIA Corporation, Santa Clara, CA (US)

(72) Inventors: Sreedhar Narayanaswamy, Sunnyvale, CA (US); Shantanu K. Sarangi, Saratoga, CA (US); Hemalkumar Chandrakant Doshi, San Jose, CA (US); Hari Unni Krishnan, San Carlos, CA (US); Gunaseelan Ponnuvel, San Jose, CA (US); Brian Lawrence Smith, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 287 days.

(21) Appl. No.: 16/826,005

(22) Filed: Mar. 20, 2020

(65) Prior Publication Data
US 2021/0294791 A1   Sep. 23, 2021

(51) Int. Cl.
*G06F 16/23*   (2019.01)
*G06F 11/27*   (2006.01)
*G06F 11/273*  (2006.01)

(52) U.S. Cl.
CPC .......... *G06F 16/2379* (2019.01); *G06F 11/27* (2013.01); *G06F 11/273* (2013.01)

(58) Field of Classification Search
CPC ............................ G06F 16/2379; G06F 11/273
See application file for complete search history.

(56) References Cited

U.S. PATENT DOCUMENTS

| 2010/0063759 | A1  | 3/2010  | Nishiyama |           |
|--------------|-----|---------|-----------|-----------|
| 2017/0357310 | A1* | 12/2017 | Hovis     | G06F 1/206 |
| 2020/0116783 | A1* | 4/2020  | Kalva     | G06Q 10/087 |

FOREIGN PATENT DOCUMENTS

WO   20170213973 A1   12/2017

OTHER PUBLICATIONS

International Search Report in International Application No. PCT/US2021/023295 dated Jul. 6, 2021.

* cited by examiner

*Primary Examiner* — Manuel L Barbee
(74) *Attorney, Agent, or Firm* — Leydig, Voit & Mayer, Ltd.

(57) ABSTRACT

Latency of in-system test (IST) execution for a hardware component of an in-field (deployed) computing platform may be reduced when a value of a physical operating parameter can be changed without rebooting the computing platform. A test (e.g., patterns or vectors) is executed for varying values of the physical operating parameter (e.g., supply voltage, clock speed, temperature, noise magnitude/duration, operating current, and the like), providing the ability to detect faults in the hardware components.

21 Claims, 12 Drawing Sheets

HARDWARE-CONTROLLED UPDATING OF A PHYSICAL OPERATING PARAMETER FOR IN-FIELD FAULT DETECTION

TECHNICAL FIELD

The present disclosure relates to in-system test (IST) execution for in-field hardware components, and more particularly to hardware-controlled updating of a physical operating parameter for in-field fault detection.

BACKGROUND

Computing devices, such as chips and other circuitry, are typically tested by manufacturers prior to deployment in the field to verify whether they are functioning properly and to detect manufacturing defects. For example, computing devices may be tested prior to deployment using Automated Test Equipment (ATE). However, some devices develop defects after being deployed due to various factors (e.g., environmental hazards, aging, etc.), and in many applications it is important to have in-field fault detection capabilities. For example, autonomous functional safety requirements specify that components are to adhere to a Fault Tolerant Time Interval (FTTI) of 100 milliseconds, which represents a permitted time between an occurrence of a permanent fault and the execution of a remedial action.

Conventionally, an In-System Test (IST) may be used to detect the occurrence of a permanent fault when it occurs in order to adhere to an FTTI. However, while a hardware component—such as an Integrated Circuit (IC)—may pass an IST, there may be latent defects in the component or connections to the component that develop over time. To better detect when a hardware component is close to failing or to estimate a degradation rate, an IST is executed for different values of a supply voltage to identify a lowest operating supply voltage (Vmin) for the hardware component. Each time the value is changed for the IST, a time-consuming system reboot is required. Additionally, rebooting the system typically reduces reliability of the entire system due to power cycling. There is a need for addressing these issues and/or other issues associated with the prior art.

SUMMARY

Latency of in-system test (IST) execution for a hardware component of an in-field (deployed) computing platform may be reduced when a value of a physical operating parameter can be changed without rebooting the computing platform. A test (e.g., patterns or vectors) is executed for varying values of the physical operating parameter (e.g., supply voltage, clock speed, temperature, noise magnitude/duration, operating current, and the like), providing the ability to detect faults in the hardware components.

A method, computer readable medium, and system are disclosed for hardware-controlled updating of a physical operating parameter for in-field fault detection. In an embodiment, the method includes executing at least a portion of a test on a hardware component of an in-field computing platform to produce a first test result, where a first value is used for a physical operating parameter that is applied to the hardware component during execution of the test, storing the first test result in a memory by an IST controller within the in-field computing platform, updating, in response to a command generated by the IST controller, the physical operating parameter to use a second value that is based on the first test result, and resuming execution of the test on the hardware component using the second value for the physical operating parameter to produce a second test result.

In an embodiment, the physical operating parameter is at least one of: a supply voltage, a supply current, a clock speed, a noise magnitude, a noise duration, or a temperature.

In an embodiment, the second value is determined by the IST controller. In another embodiment, the second value is determined by a central processing unit (CPU) that is coupled to the hardware component.

In an embodiment, the first test result indicates a pass and, the method further comprises, determining that the second value is a cutoff value for the physical operating parameter when the second test result indicates a failure.

In an embodiment, the test comprises at least one of a permanent fault test or a functional test. In an embodiment, the test comprises a permanent fault test represented as one or more structural vectors. In another embodiment, the test comprises a functional test represented as one or more functional vectors.

In an embodiment, the method includes waiting a pre-determined time duration after resuming execution of the test on the hardware component before checking the second test result and rebooting the in-field computing platform when the pre-determined time duration expires and execution of the test is not complete.

In an embodiment, the method includes updating the physical operating parameter to use the second value comprises transmitting the command from the IST controller to an external component that provides the physical operating parameter to the hardware component.

In an embodiment, a system comprises an in-system test (IST) controller within an in-field computing platform and coupled to a memory and configured to: execute at least a portion of a test on a hardware component of the in-field computing platform to produce a first test result, where a first value is used for a physical operating parameter that is applied to the hardware component during execution of the test, store the first test result in the memory by the IST controller, update, in response to a command generated by the IST controller, the physical operating parameter to use a second value that is based on the first test result, and resume execution of the test on the hardware component using the second value for the physical operating parameter to produce a second test result.

In an embodiment, the system comprises at least one of an autonomous or semi-autonomous vehicle, an autonomous or semi-autonomous machine, an autonomous or semi-autonomous robot, an autonomous or semi-autonomous industrial robot, a manned or unmanned aircraft, or a manned or unmanned aquatic vessel.

In an embodiment, the system comprises at least one of a computing server system, a data center, a system-on-a-chip (SoC), or an embedded system.

In an embodiment, a non-transitory computer-readable media stores computer instructions that, when executed by one or more processors, cause the one or more processors to perform the steps of: executing at least a portion of a test on a hardware component of an in-field computing platform to produce a first test result, where a first value is used for a physical operating parameter that is applied to the hardware component during execution of the test, storing the first test result in a memory by an in-system test (IST) controller within the in-field computing platform, updating, in response to a command generated by the IST controller, the physical operating parameter to use a second value that is based on the first test result, and resuming execution of the test on the hardware component using the second value for the physical operating parameter to produce a second test result.

DETAILED DESCRIPTION

Figure 1A:
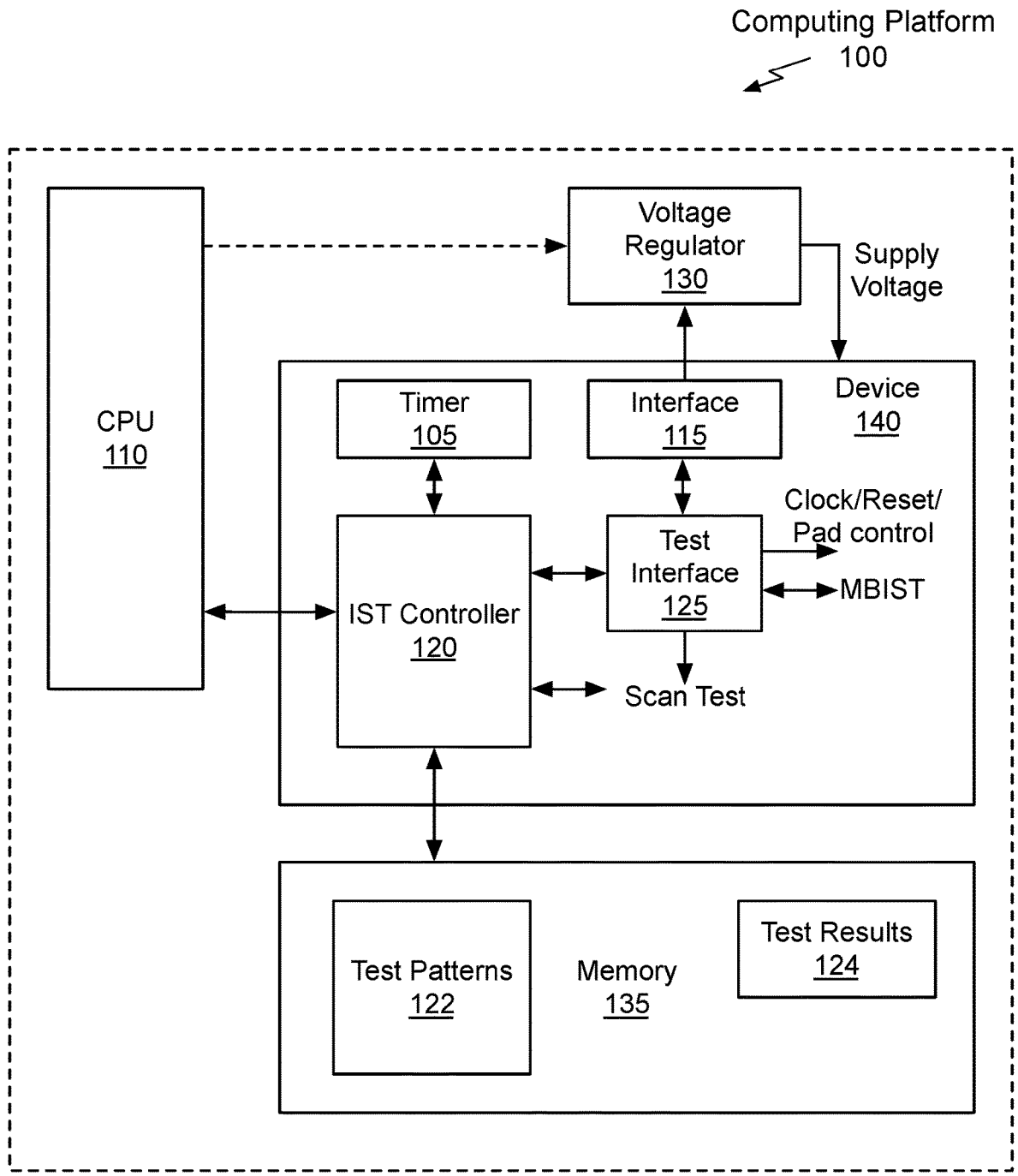
FIG. 1A illustrates a block diagram of a system, in accordance with an embodiment.

Conventionally, hardware components are characterized at manufacturing time to determine physical operating parameter values to use for correct operation (i.e., all tests passing) over different operating conditions (e.g., temperature, time operating, etc.) and manufacturing process variations. For example, functional test patterns may be applied to a batch of the hardware components over varying time periods and simulating in-field operating conditions, including simulating aging by heating (e.g., baking) to produce degradation data for each physical operating parameter. The goal of characterization is to determine baseline operating parameter values to ensure proper functioning of the hardware components when the hardware components are deployed in the field over time. Typically, the worst degradation measurements obtained for a subset of the batch are used to establish a degradation margin that is included in the baseline operating parameter values.

IST may be used to determine operating parameter values for the hardware components when the hardware component is deployed in the field, effectively characterizing each hardware component individually for the actual operating conditions that the hardware component is subjected to. IST is also useful for testing functional safety—e.g., that components are operating and functionally normally or within an expected range of tolerances. Benefits of characterizing each hardware component in the field are that operating parameters may be set to values that are specific to the particular hardware component rather than the baseline operating parameter values determined at the time of manufacture. Using operating parameter values that are specific to the particular hardware component may improve performance while reducing power consumption compared with using the baseline values. Testing deployed components also has the benefit of detecting when a component may have a fault and/or requires repair, corrective measures, or is otherwise unsafe to use.

IST is used to identify a boundary between passing and failing values for each operating parameter, where the boundaries and corresponding "cutoff" values are specific to the hardware component and in-field operating conditions. For example, Vmin is the lowest value of the supply voltage at which a test passes, as determined during IST for a hardware component. When Vmin is lower than the baseline value of the supply voltage, power consumption is reduced. When Vmin is higher than the baseline value of the supply voltage, the hardware component may continue to function without failing and requiring replacement. In other words, the in-field lifespan of the hardware component may be increased compared with simply using the baseline supply voltage.

As previously explained, during IST a conventional system needs to be rebooted to change one or more operating parameter values. For example, a reboot is needed to change from functional mode to test mode after an operating parameter value is changed by a central processing unit (CPU) that is external to the hardware component. As described further herein, the reboot may be avoided during IST by enabling the hardware component to adjust one or more operating parameter values directly, instead of adjusting the operating parameter value by the CPU.

FIG. 1A illustrates a block diagram of an in-field computing platform 100, in accordance with an embodiment. The computing platform includes a CPU 110, device 140, voltage regulator 130, and memory 135. In an embodiment, the computing platform 100 comprises a systems-on-chip (SoC), multi-chip module, (MCM) printed circuit board (PCB), or any other feasible implementation. The computing platform 100 may be implemented as at least part of an Advanced Driver Assistance System (ADAS), autonomous driving system, and/or any form of vehicle that may or may not include autonomous and/or semi-autonomous functionality. The computing platform 100 may be implemented as at least part of an autonomous or semi-autonomous vehicle, an autonomous or semi-autonomous machine, an autonomous or semi-autonomous robot, a manned or unmanned aircraft, or a manned or unmanned aquatic vessel. The computing platform 100 may be implemented as at least a portion of a server cluster. Alternatively, the computing platform 100 may be implemented within an embedded system.

In the context of the following description, the device 140 is a hardware component that may comprise an integrated circuit, an SoC, memory, interface, logic circuit, a semiconductor chip, and/or other physical component or combination thereof. In an embodiment, the memory 135 comprises dynamic random access memory (DRAM) that may be separate from the device 140 or integrated into the device 140. In an embodiment, the voltage regulator 130 is configured by a command, instruction, and/or signal to provide a supply voltage to the device 140. In an embodiment, the voltage regulator 130 is included within a power management device. In an embodiment, the voltage regulator 130 includes multiple regulators to generate separate supply voltages for different rails within the device 140 and each of the regulators may be separately configured by the command.

Although the computing platform 100 is described in the context of processing units, an IST controller 120 within the device 140 may be implemented as a program, custom circuitry, or by a combination of custom circuitry and a program. In an embodiment, the device 140 is the parallel processing unit 300 shown in FIG. 3. Furthermore, persons of ordinary skill in the art will understand that any system that performs the operations of the framework is within the scope and spirit of embodiments of the present disclosure.

The IST controller 120 performs in-field testing of hardware components (e.g., circuit, logic, interface, memory, etc.) of the in-field computing platform 100. In an embodiment, the IST controller 120 executes fault and/or functional tests on at least a portion of the computing platform 100. Test patterns 122 (e.g., vectors) that are stored in the memory 135 are applied to the portion of the computing platform 100 being tested. In an embodiment, a vector is a binary representation of both the code and data needed to execute the vector. The location in memory 135 where one or more of the test patterns 122 and test results 124 are stored may be pre-determined. In an embodiment, the test results 124 are stored within the IST controller 120.

The test patterns 122 may be loaded into the memory 135 from another storage resource, such as system memory or flash storage. In another embodiment, at least a portion of the test (e.g., one or more test patterns) applied by the IST controller 120 are dynamically generated according to an algorithm instead of being read from the memory 135. In an embodiment, a test interface 125 receives the test patterns 122 from the IST controller 120 and transmits the vectors to test circuits (e.g., scan flip-flops) for testing for at least a portion of the device 140. The IST controller 120 communicates through the test interface 125 to control execution of scan testing, memory built-in self-test (MBIST), and other signals and circuits such as the clock, reset, and pads. In an embodiment, the test interface 125 is implemented in accordance with the Institute of Electrical and Electronics Engineers (IEEE) 1500 interface architecture standard. In accordance with aspects of the disclosure, a scan mode test, such as a Fast Scan Mode (e.g., FTM2CLK) test for logical gates may be used to detect subtle gate defects, even if they are to individual gates. The subtle gate defects can degrade over time to cause a permanent fault, which may be detected during IST.

The IST controller 120 controls execution and sequencing of the test patterns 122, including controlling the test interface 125 and voltage regulator 130. An interface 115 provides a communication path between the IST controller 120 (via the test interface 125) and the voltage regulator 130. In an embodiment, the interface 115 is an inter-integrated circuit (I2C) interface. In other embodiments, the interface 115 provides communication paths for the IST controller 120 to control one or more operating parameters, in addition to the supply voltage, or instead of the supply voltage. Examples of other operating parameters include values of a supply current, operating clock speed, an input resistance, an input impedance, noise magnitude/duration, and/or temperature.

In an embodiment, the interface 115 is coupled to clock generation circuitry that may be configured to provide a clock for the device 140 according an operating clock speed specified by a command received from the IST controller 120. In an embodiment, the interface 115 may be coupled to a current regulator that may be configured to regulate a current for the device 140 according to a command received from the IST controller 120. In an embodiment, the interface 115 is coupled to circuitry for regulation of input resistance, input impedance, noise, and/or temperature for the device 140, each of which may be configured according to a command received from the IST controller 120.

During in-field fault and/or functional testing, the IST controller 120 adjusts at least one physical operating parameter, such as the supply voltage. The IST controller 120 may transmit a command to a voltage regulator 130 through the test interface 125 and the interface 115 to adjust the supply voltage by controlling the voltage regulator 130 to change the value of the supply voltage provided to the device 140. In contrast, in a conventional computing platform, the CPU 110 updates the voltage regulator 130 via the dashed arrow in functional test mode and a reboot of the computing platform 100 is typically required to reload the software for fault testing before entering test mode to perform IST. The test latency is reduced because the IST controller 120 can transmit a command to the voltage regulator 130 to update the voltage level and the complete system reboot is avoided. Reducing the amount of time needed to complete in-field IST is beneficial because the computing platform 100 is not available for other processing during IST. Reducing the number of system reboots is beneficial because the occurrence of faults due to fabrication defects (e.g., reliability of bump contacts) typically increases as the number of system reboots increases.

When execution of a test (e.g., one or more of the test patterns 122) completes during IST, test results 124 are stored in the memory 135. The test results 124 indicate whether the test passed or failed. The test results 124 may be read by the IST controller 120 and/or CPU 110 and used to determine a next value of an operating parameter and/or a sequence in which one or more of the test patterns 122 are applied. In an embodiment, one or more operating conditions (e.g., noise, temperature, load, voltage levels, etc.) are measured and available for use to determine the next value of an operating parameter and/or the sequence of the test patterns. In an embodiment, during testing, one or more operating conditions are measured and an algorithm is used to compensate for any deviation(s) compared with an expected range for the operating conditions. In an embodiment, at the start of testing, the IST controller 120 initializes a timer 105 and waits to read the test results 124 until after the timer 105 expires. If, after the timer expires, the test results 124 are not ready, the IST controller 120 may indicate a reboot is needed before IST can continue. In an embodiment, the code to boot the CPU 110 and/or computing platform 100 is stored in the memory 135.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

The IST controller 120 or CPU 110 may be configured to update values of operating parameters based on the in-field IST to improve performance of the computing platform 100. In an example, when the computing platform 100 is deployed in a data center running specific workloads during the day and has a much lighter workload during night. Therefore, the workload profile is not evenly distributed over each 24 hour period, as may have been assumed during the baseline characterization. In an embodiment, the IST controller 120 executes tests during the day to capture the daytime workload operating conditions in the test results 124 and determine values of the operating parameters for use during the day. Similarly, the IST controller 120 executes tests during the night to capture the nighttime workload operating conditions in the test results 124 and determine values of the operating parameters for use during the night. Therefore, the operating parameter values for the device 140 can be tuned for specific operating conditions. In comparison, simply using the baseline operating parameter values may result in increased device failures during the day and power consumption and/or performance inefficiency during the night.

Figure 1B:
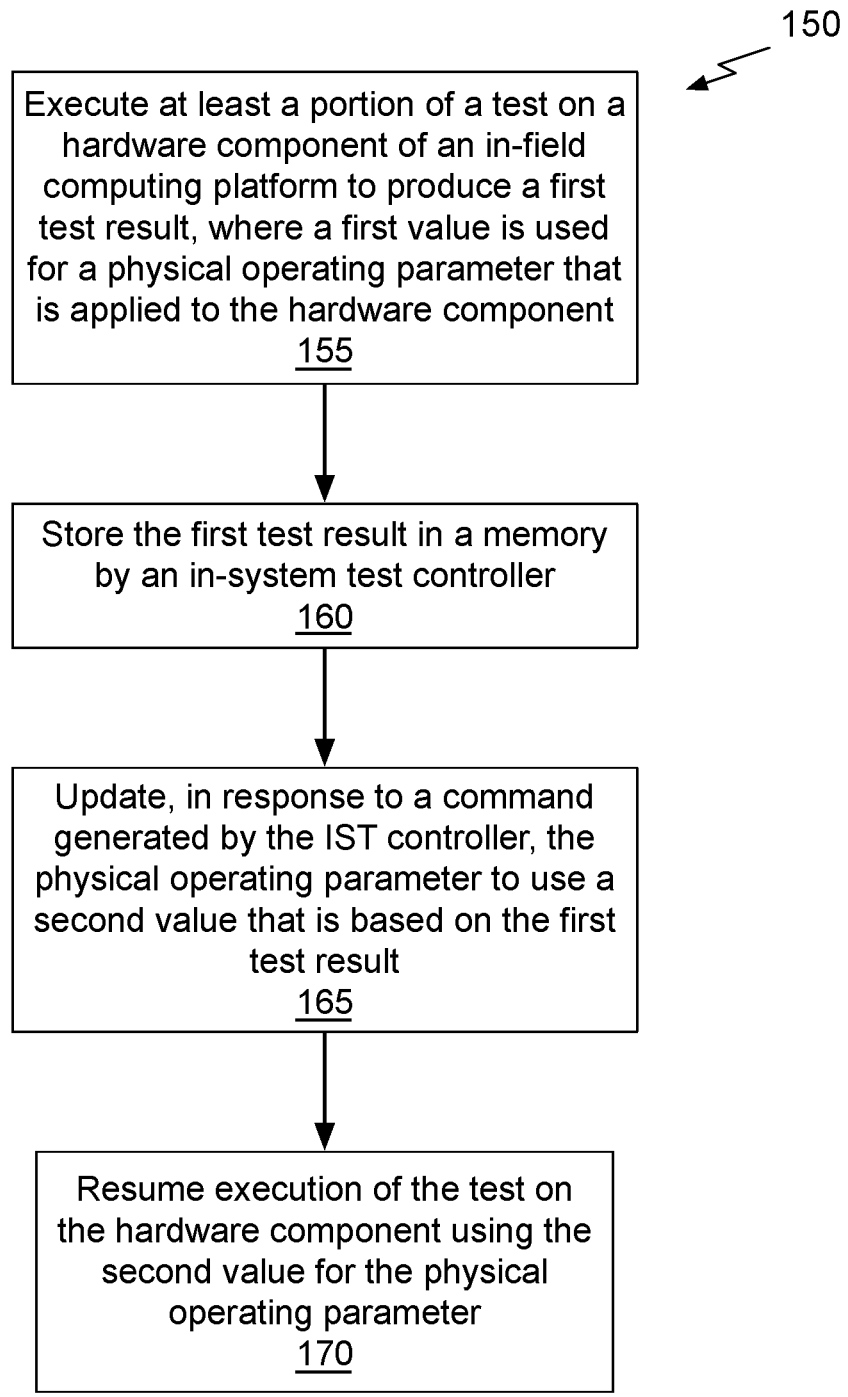
FIG. 1B illustrates a flowchart of a method for executing in-system testing, in accordance with an embodiment.

FIG. 1B illustrates a flowchart of a method 150 for executing in-system testing, in accordance with an embodiment. Although method 150 is described in the context of a controller (e.g., processing unit), the method 150 may also be performed by a program, custom circuitry, or by a combination of custom circuitry and a program. For example, the method 150 may be executed by a GPU (graphics processing unit), CPU (central processing unit), or any processor capable of implementing IST. In an embodiment, the device 140 is the parallel processing unit 300 shown in FIG. 3. Furthermore, persons of ordinary skill in the art will understand that any system that performs method 150 is within the scope and spirit of embodiments of the present disclosure.

At step 155, at least a portion of a test is executed on hardware component of an in-field computing platform 100, such as the device 140, to produce a first test result, where a first value is used for a physical operating parameter that is applied to the in-field hardware component. In an embodiment, a full fault or functional test may be subdivided into portions that each include one or more test patterns from the test patterns 122. Instead of applying the full test during IST and generating a pass/fail test result when execution of the full test is finished, a test result may be generated for each portion. In an embodiment, execution of a test is stopped when a failure is detected. Therefore, test time may be reduced when a failure is detected for one of the portions and execution of the entire test is avoided. In an embodiment, the full test is a functional test and the test is executed by the CPU 110 to test the device 140. In another embodiment, the portion of the test is applied by the IST controller 120.

At step 160, the first test result is stored in the memory 135 within the computing platform 100. In an embodiment, the first test result is stored in the memory 135 by the IST controller 120. The first test result may indicate that the portion of the test either passed or failed when executed by the device 140.

At step 165, in response to a command generated by the IST controller 120, the physical operating parameter is updated to a second value that is based on at least the first test result. The second value may be equal to or different compared with the first value. In an embodiment, when the first test result indicates a failure, the IST controller 120 may increase or decrease the value of the physical operating parameter, updating the physical operating parameter to a value for which the same test or a different test had previously passed during IST.

For example, to determine Vmin the IST controller 120 uses a first value for which the entire test is expected to pass based on the baseline operating parameter value and previous test results. When the entire test (all of the test patterns 122) passes using the first value for the supply voltage, the IST controller 120 reduces the supply voltage to the second value and begins executing at least a portion of the entire test. The IST controller 120 may be configured to execute the entire test to generate a test result or the IST controller 120 may be configured to execute one or more portions (e.g., slices) of the entire test to generate a test result for each portion.

The duration of IST may be reduced by implementing a search algorithm in microcode for execution by the IST controller 120 to dynamically apply the test patterns 122 in a sequence based on the test results 124 for different values of at least one of the physical operating parameters. In contrast, during conventional IST, the entire test is executed for each of the different values of the operating parameter before the test results are examined.

To reduce the duration of IST, as soon as a failing test result occurs, the IST controller 120 can identify the pass/fail boundary corresponding to Vmin by testing using supply voltages higher than the supply voltage corresponding to the failing test result. Additional test patterns may also be applied based on the results of the initial test to more comprehensively test near the pass/fail boundary.

When a lowest supply voltage corresponding to a passing test result is identified, the entire test or a portion of the entire test may be repeated one or more times to confirm that the supply voltage is at Vmin, the lowest supply voltage at which all test patterns 122 pass successfully. In another embodiment, instead of searching for Vmin by progressively decreasing the supply voltage to find a first failure, the IST controller 120 may start testing using a low supply voltage and progressively increase the supply voltage. However, starting with a higher supply voltage increases the likelihood that execution of the test will complete and not get stuck or hung. Additionally, starting with a higher supply voltage ensures that data within the device 140 is more reliably cleared and avoids the risk of exposing any secure data due to failures during a secure boot at a speculative (e.g., too low) supply voltage.

At step 170, execution of the test on the in-field hardware component is resumed using the second value for the physical operating parameter to produce a second test result. After execution of the entire test (or another portion of the test) is completed, the IST controller 120 may return to step 160 to store a second test result in the test results 124.

Figure 2A:
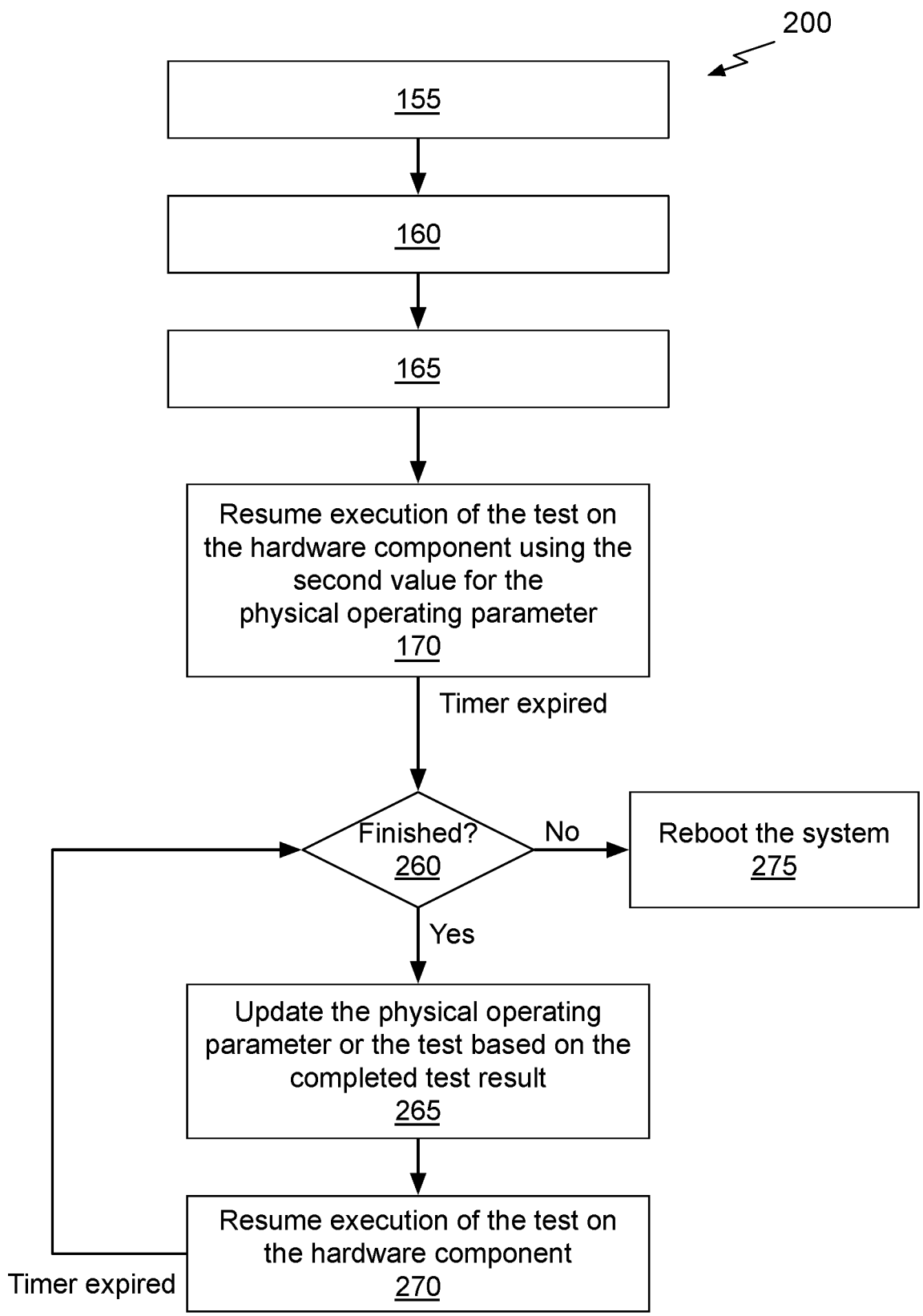
FIG. 2A illustrates a flowchart of a method for testing a hardware component using different operating parameter value, in accordance with an embodiment.

In addition to implementing a search algorithm, the IST controller 120 may be configured to determine if a test has not completed execution and is stuck. In particular, when the supply voltage is too low, it is possible that execution of the test will not finish. FIG. 2A illustrates a flowchart of a method 200 for testing a hardware component using different operating parameter values, in accordance with an embodiment. Although method 200 is described in the context of a controller (e.g., processing unit), the method 150 may also be performed by a program, custom circuitry, or by a combination of custom circuitry and a program. For example, the method 200 may be executed by a GPU, CPU, or any processor capable of implementing IST. Furthermore, persons of ordinary skill in the art will understand that any system that performs method 200 is within the scope and spirit of embodiments of the present disclosure.

Steps 155, 160, and 165 are performed as previously described in conjunction with FIG. 1B. At step 170, execution of the test on the in-field hardware component is resumed using the second value for the physical operating parameter to produce a second test result. When execution of the test is resumed, the timer 105 is initialized. In an embodiment, the timer 105 is initialized to a predetermined value that is specific to the test and is an adequate duration of time for generation of the second test result. When the timer 105 expires during step 170, the IST controller 120 determines if the entire test or portion of the entire test finished executing at step 260. In an embodiment, each test result in the test results 124 comprises a test done status indicator and a test pass status indicator, where the test done status indicates whether the test has finished (1) or not (0) and the test pass status indicates whether the test passed (1) or failed (0). In an embodiment, the test pass status is valid only when the test done status is set to 1.

If, at step 260, the IST controller 120 determines that the test did not finish, then at step 275, the IST controller 120 indicates that the computing platform should be rebooted. In another embodiment, the CPU 110 performs steps 260 and 275. If, at step 260, the IST controller 120 determines that the test did finish, then at step 265, the IST controller 120 updates the physical operating parameter or the test based on the completed test result. The step 265 is described in greater detail in conjunction with FIG. 2B. Updating the test includes identifying a portion of the entire test to be executed. For example, the IST controller 120 or the CPU 110 may be configured to determine a sequence for the test patterns 122. In an embodiment, the IST controller 120 or the CPU 110 may execute the same portion of the test or the entire test with or without updating the physical operating parameter. At step 270, execution of the test on the hardware component resumes. Steps 260, 275, 265, and 270 may be repeated until IST is completed for the hardware component. A portion of the test results 124, operating parameter values, and/or operating conditions may be stored for use by the IST controller 120 and/or in-field characterization of the hardware component.

Figure 2B:
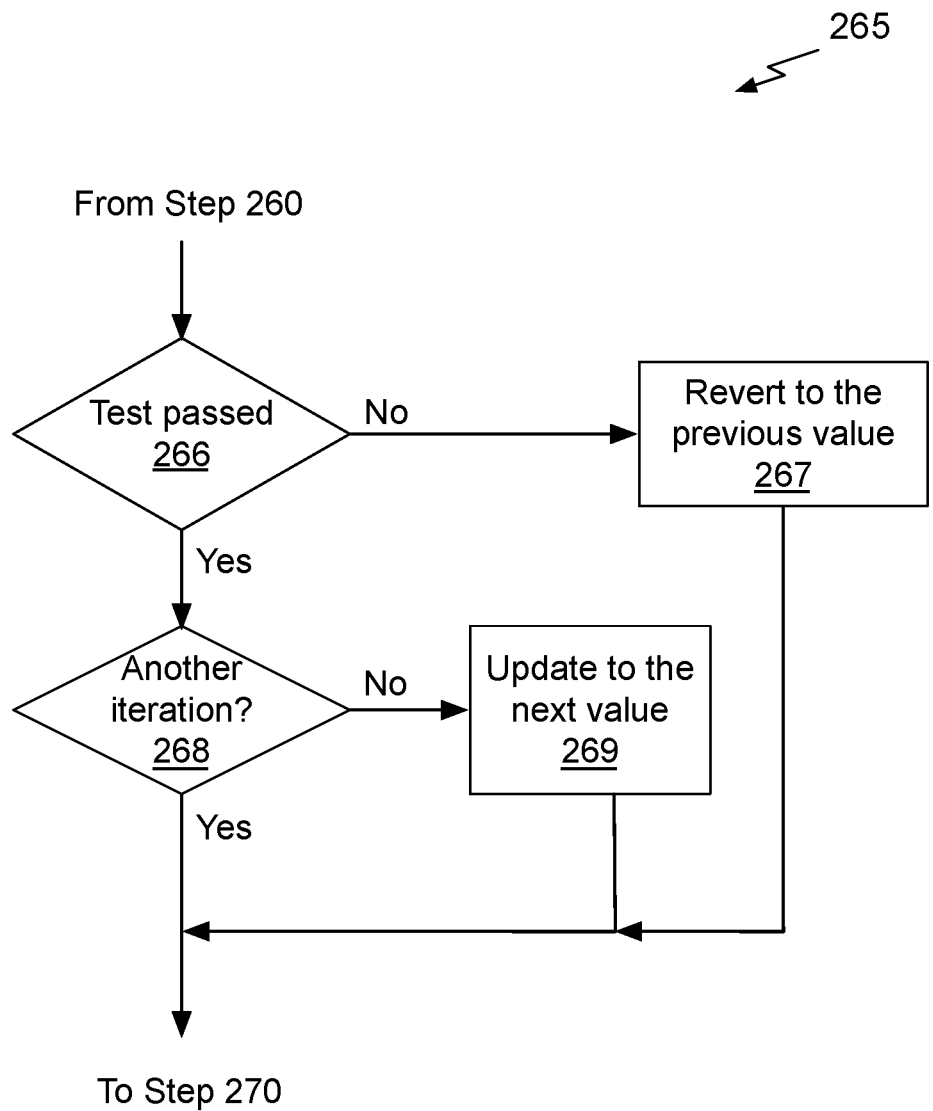
FIG. 2B illustrates a flowchart of a step of the method shown in FIG. 2A, in accordance with an embodiment.

FIG. 2B illustrates a flowchart of the step 265 of the method 200 shown in FIG. 2A, in accordance with an embodiment. At step 266, the IST controller 120 determines, based on the completed test result, if the test was passed. The test result may be a signature (for comparison to an expected signature) or a pass/fail indication. The duration of IST may be reduced by offloading the test result signature comparison from the CPU 110 to the IST controller 120.

If the test was not passed, then the IST controller 120 updates the operating parameter by reverting to a previous value before proceeding to step 270. Otherwise, if the test was passed, then, at step 268, the IST controller 120 determines if the test should be executed for another iteration. If the IST controller 120 determines that the test should be executed for another iteration, then at step 270 execution of the test resumes. Otherwise, at step 269, the IST controller 120 updates the operating parameter to a next value that is different compared with the value used to generate the completed test result, before proceeding to step 270.

The IST controller 120 provides multiple techniques for reducing the duration of IST for in-field characterization of a hardware component. Specifically, the IST controller 120 can control the operating parameter values during reduces the duration of IST by removing the latency introduced for rebooting the computing platform 100 for each update of an operating parameter. Additionally, the IST controller 120 may further reduce the duration of IST by implementing a search algorithm for the pass/fail boundary without necessarily executing the entire test at each value of a particular operating parameter. Furthermore, the IST controller 120 may perform the signature comparison for each test result to determine whether each test has passed or failed.

For speculative supply voltage values, a risk of exposing on-chip data is reduced when the data may be more reliably cleared by increasing the supply voltage level and performing the clear. In contrast, when a reboot occurs at a speculative supply voltage value, the data may not be reliably cleared and is at risk of exposure.

Reducing the IST duration provides the capability of determining cutoff values of operating parameters in the field under real-use conditions. The cutoff values may be used to estimate degradation specific to the particular hardware component. The measured cutoff values for a specific hardware component may be less conservative compared with the baseline values for the operating parameter. Therefore, performance may be improved and/or the lifespan of the hardware component may be extended. Furthermore, determination of the cutoff values enables measurement of degradation over time and prediction of functional failures.

Patent application Ser. No. 16/601,900 filed Oct. 15, 2019 and titled "Enhanced In-System Test Coverage Based on Detecting Component Degradation," describes a technique for determining a degradation rate of an physical operating parameter of a hardware component from results of tests executed for different values of physical operating parameters (e.g., supply voltage). The IST technique described herein may be used to generate degradation data for hardware components in the field. The IST technique described herein may be used to perform in-field testing for applications where early detection of degrading faults is essential to improve safety and/or operational availability.

Figure 2C:
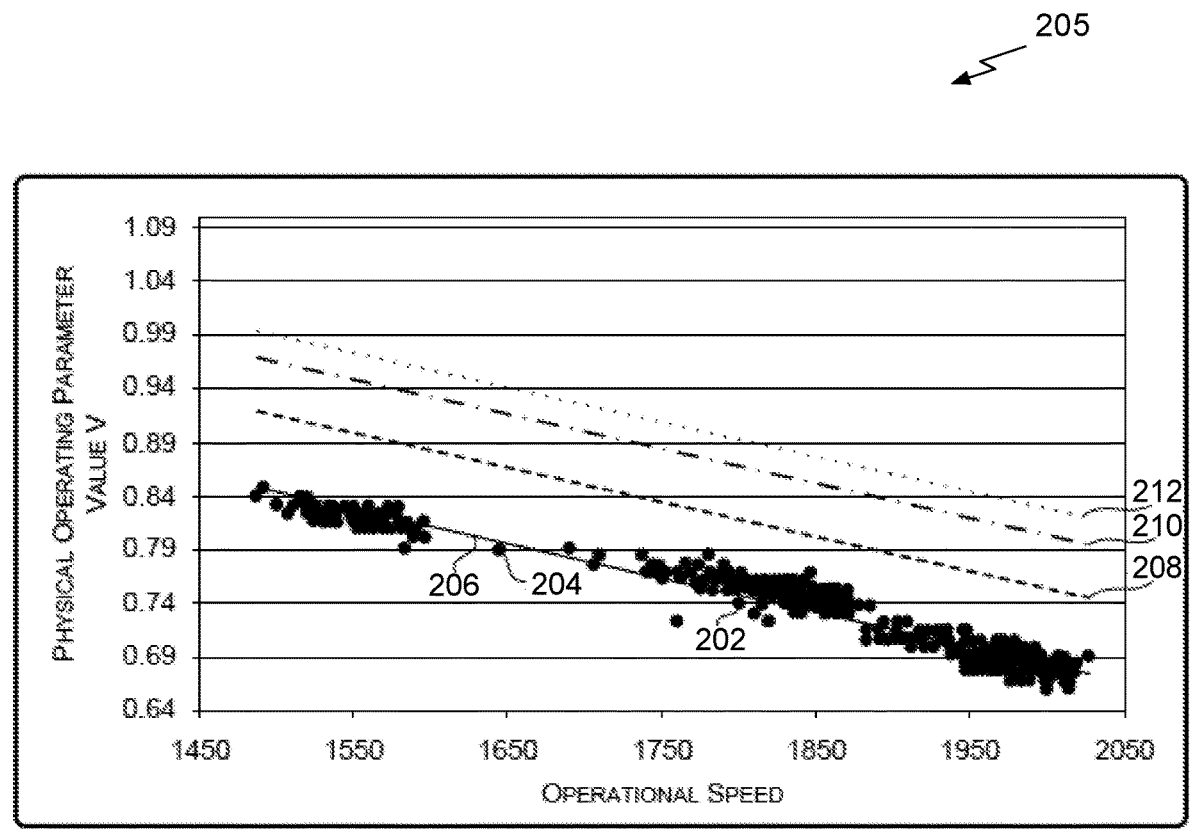
FIG. 2C is a graph illustrating relationships between operational speed of hardware components and cutoff values of a physical operating parameter, in accordance with an embodiment.

FIG. 2C is a graph 205 illustrating relationships between operational speed of hardware components and cutoff values of a physical operating parameter, in accordance with an embodiment. Each point in the graph 205, such as points 202 and 204 may represent a cutoff value of a respective hardware component that is tested prior to deployment on a computing platform, such as at a factory, or early in deployment on a computing platform, such as the computing platform 100. In at least some embodiments, the cutoff value of each hardware component may be determined using approaches described herein. As shown, the point 202 may correspond to a hardware component with an operational speed of 1800 and a cutoff value of 0.74 V. The point 204 may correspond to a hardware component with an operational speed of 1650 and a cutoff value of 0.79 V. A threshold line 206 is fit to the points of the graph 205 showing that as the operational speed increases, the cutoff value tends to decrease.

The IST controller 120 may leverage the relationship of the graph 205 in determining a value(s) of a physical operating parameter(s) for a test, allowing the cutoff value to be identified in fewer iterations of the test and to be accounted for in determining the degradation rate. The IST controller 120 may use operating conditions, such as the temperature, resulting in the values of the physical operating parameter being different for different test runs. For example, a temperature of 45 degrees Celsius results in a value of 460 mV for a first test and a temperature of 75 Celsius results in a value of 440 mV for a second test. As described herein, the temperature, operational speed, and/or other characteristics may be captured in a table the IST controller 120 uses to lookup values of physical operating parameters for the tests and/or to compute the values.

Returning to FIG. 2C, the graph 205 shows threshold lines 206, 208, 210, and 212, which may correspond to applied values of the physical operational parameter for different operating conditions and/or reference degradation rate values. The threshold lines 208, 210, and 212 may correspond to thresholds on cutoff values of the hardware components that correspond to the points in the graph 205 at different operational durations after deployment and may be offset from the threshold line 206 to capture degradation of the hardware components over time. In at least one embodiment, a degradation rate analyzer determines a hardware component includes a latent defect if the performance characteristic (the cutoff value in this case) is too high for the age and/or usage amount of the hardware component to trigger one or more remedial actions by a remedial action manager.

As indicated in FIG. 2C, at initial deployment, the degradation rate analyzer may determine the hardware component includes a latent defect if the cutoff value exceeds a corresponding value on the threshold line 208 upon or before deployment. The degradation rate analyzer may determine the hardware component includes a latent defect if the cutoff value exceeds a corresponding value on the threshold line 210 from deployment to 5000 hours of operation. The degradation rate analyzer may determine the hardware component includes a latent defect if the cutoff value exceeds a corresponding value on the threshold line 212 from deployment to 5000 hours of operation and on. Although hours of operation is shown in FIG. 2C, another form of measurement of usage or age of hardware components may be used.

In at least one embodiment, a degradation rate determiner provides the degradation rate analyzer with a measurement of usage or age of a hardware component, as well as the value(s) of the performance characteristic derived from a test run(s). The degradation rate analyzer uses the measurement to compute and/or lookup a reference degradation rate value(s) and determines whether the value(s) of the performance characteristics exceeds the reference degradation rate value(s). If the degradation rate analyzer determines the reference degradation rate value(s) is exceeded, an indication may be included in analysis results provided to the remedial action manager to initiate one or more actions. Examples of remedial actions include disabling one or more functions of the computing platform 100, such as a function that is effectuated using the hardware component. In embodiments where the computing platform 100 is an automated driving system of the vehicle 900 of FIG. 6, the one or more remedial actions may include disabling autonomous driving of the vehicle 900 and/or one or more ADAS features. Further examples of remedial actions include causing presentation of an indicator(s) of the degradation rate(s) exceeding the reference degradation rate(s).

Parallel Processing Architecture

Figure 3:
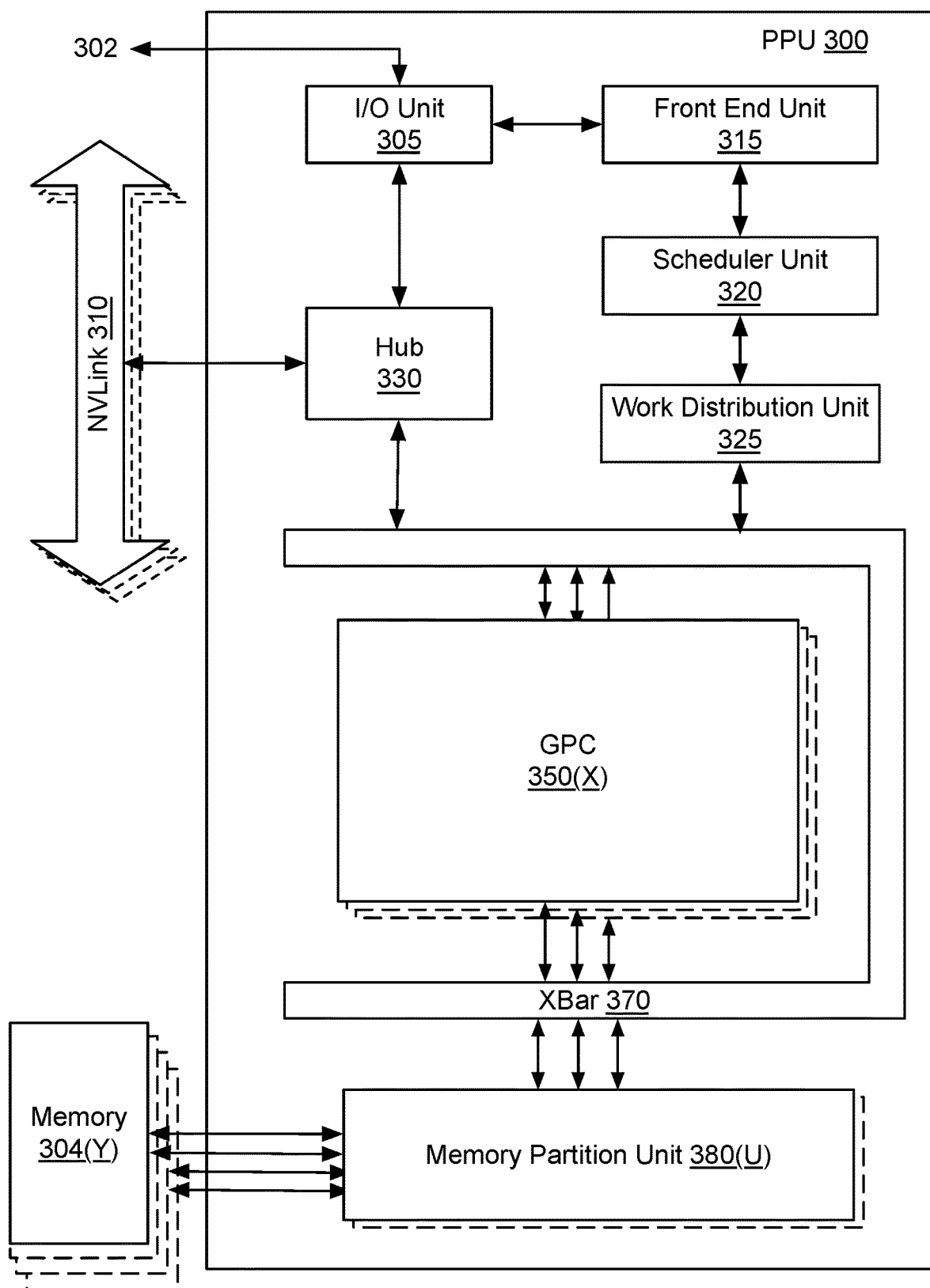
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of DRAM devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
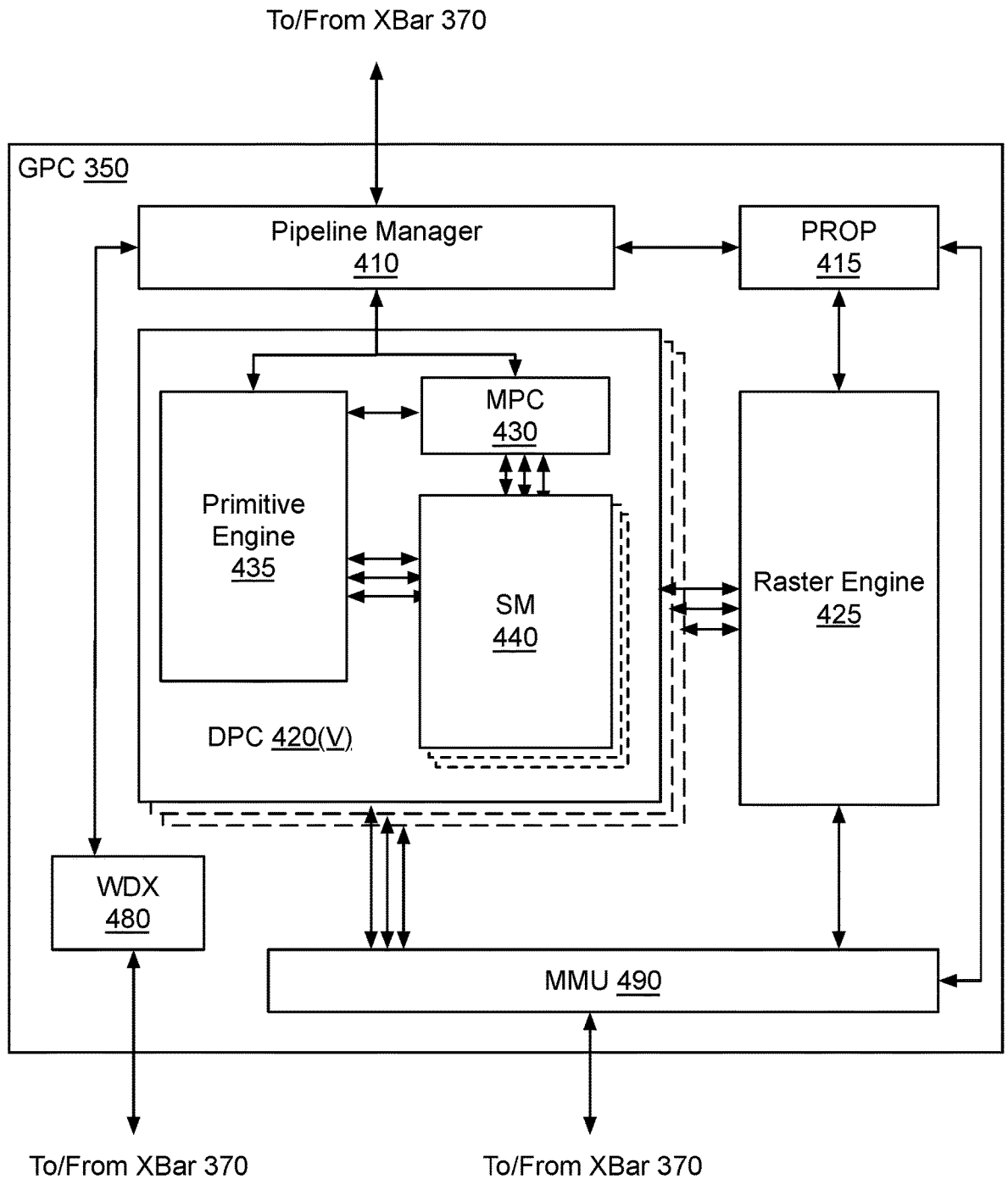
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
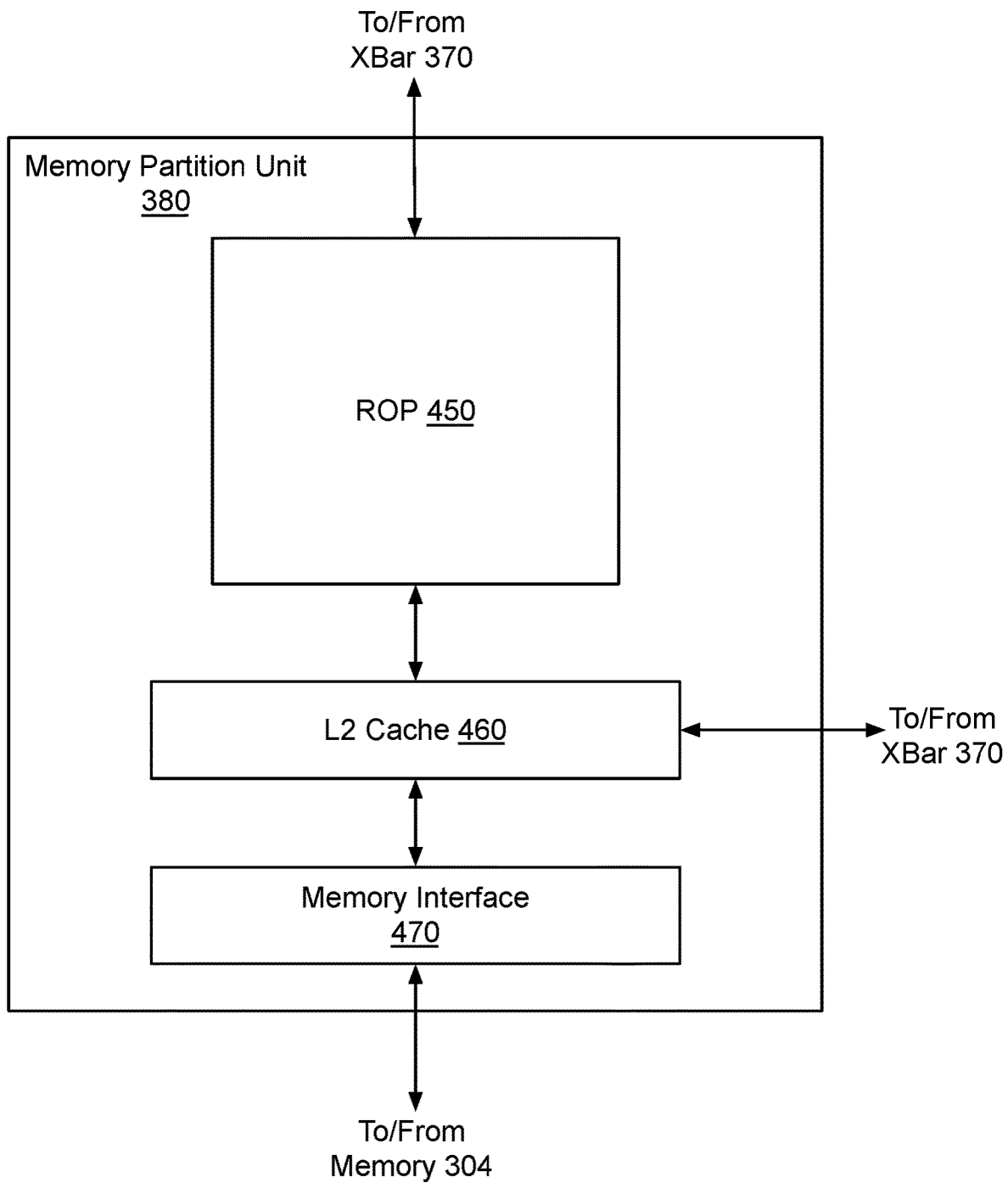
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
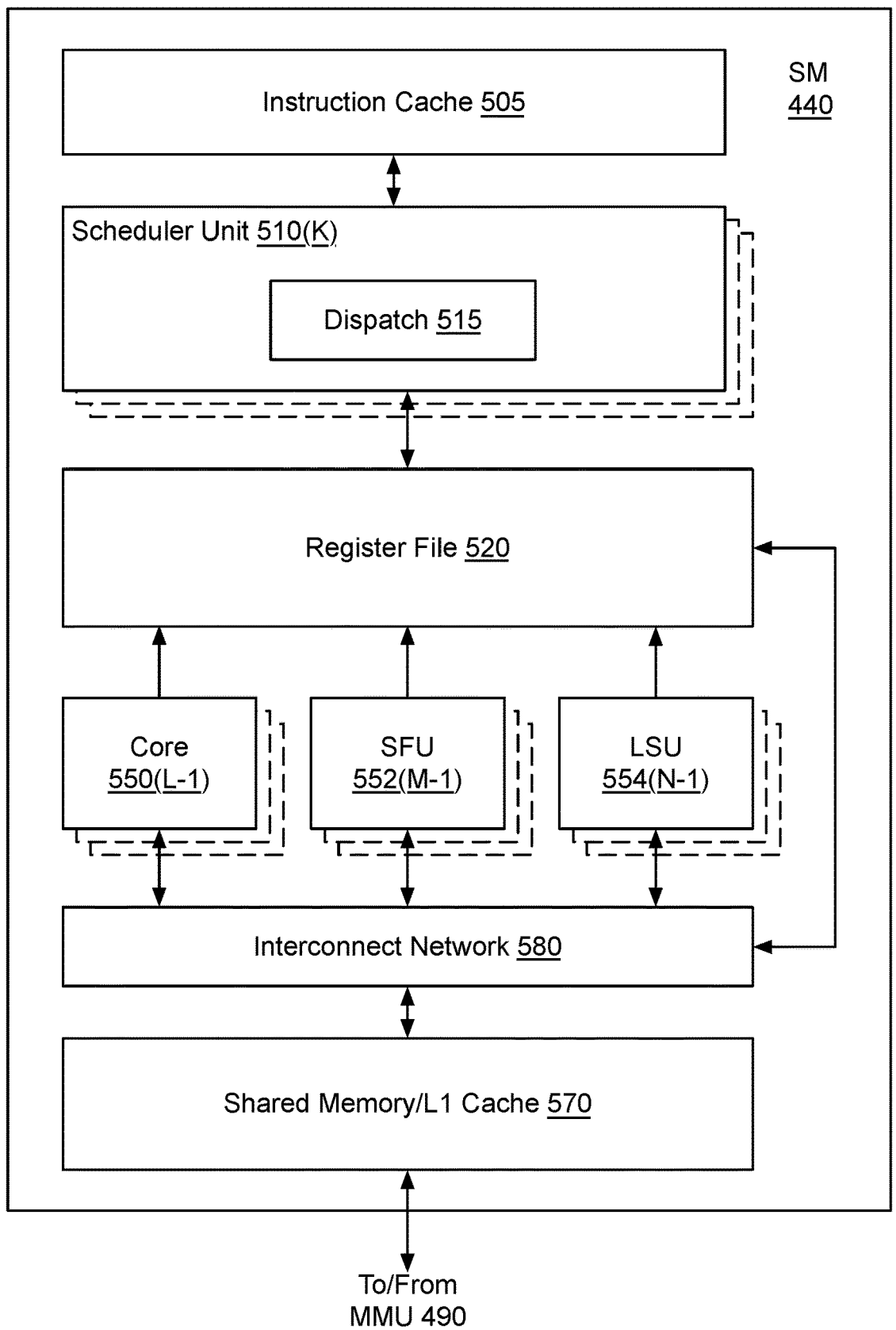
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 570. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
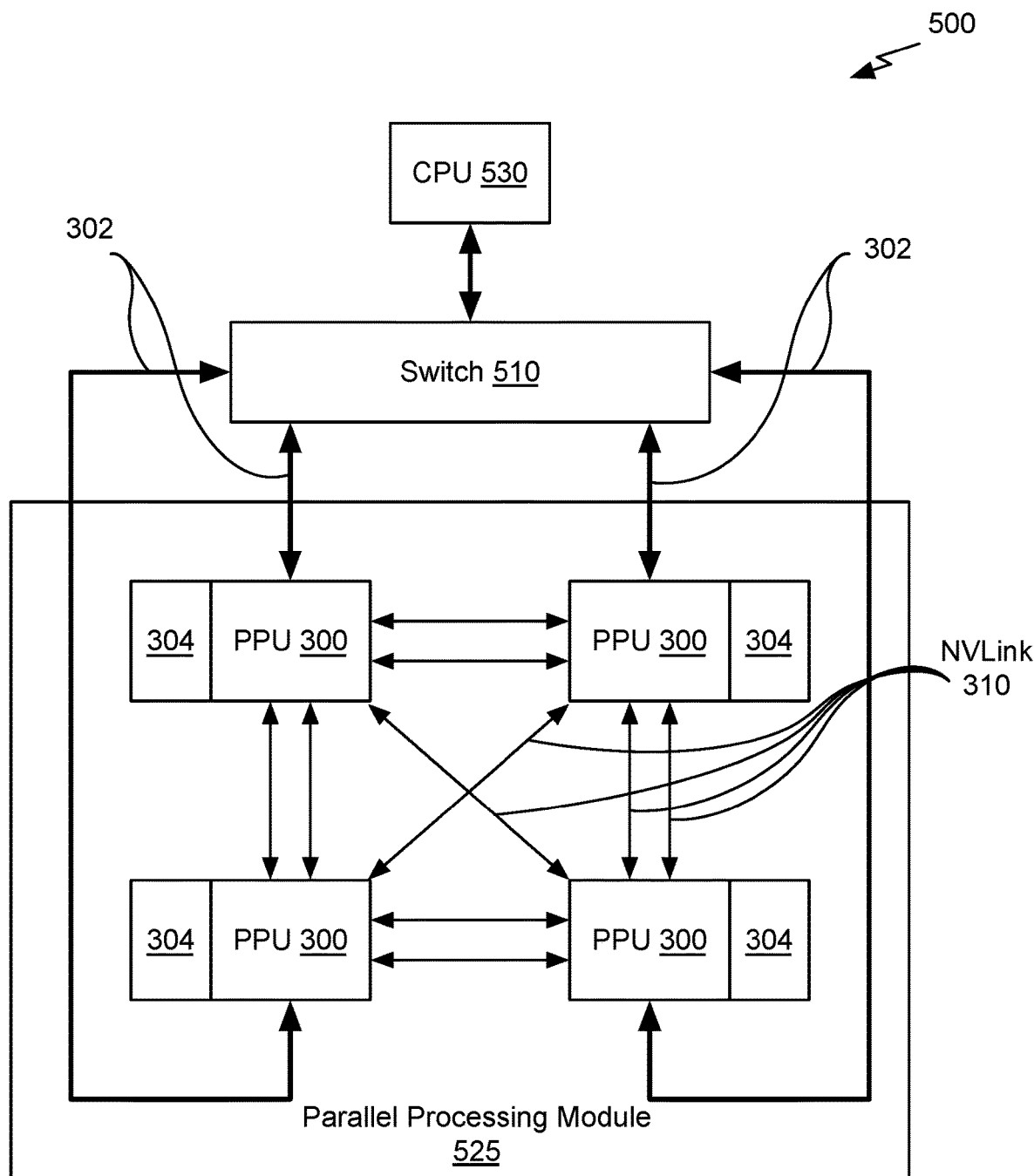
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 150 shown in FIG. 1 and/or the method 200 shown in FIG. 2A. The processing system 500 includes a CPU 530, switch 510, and multiple PPUs 300, and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
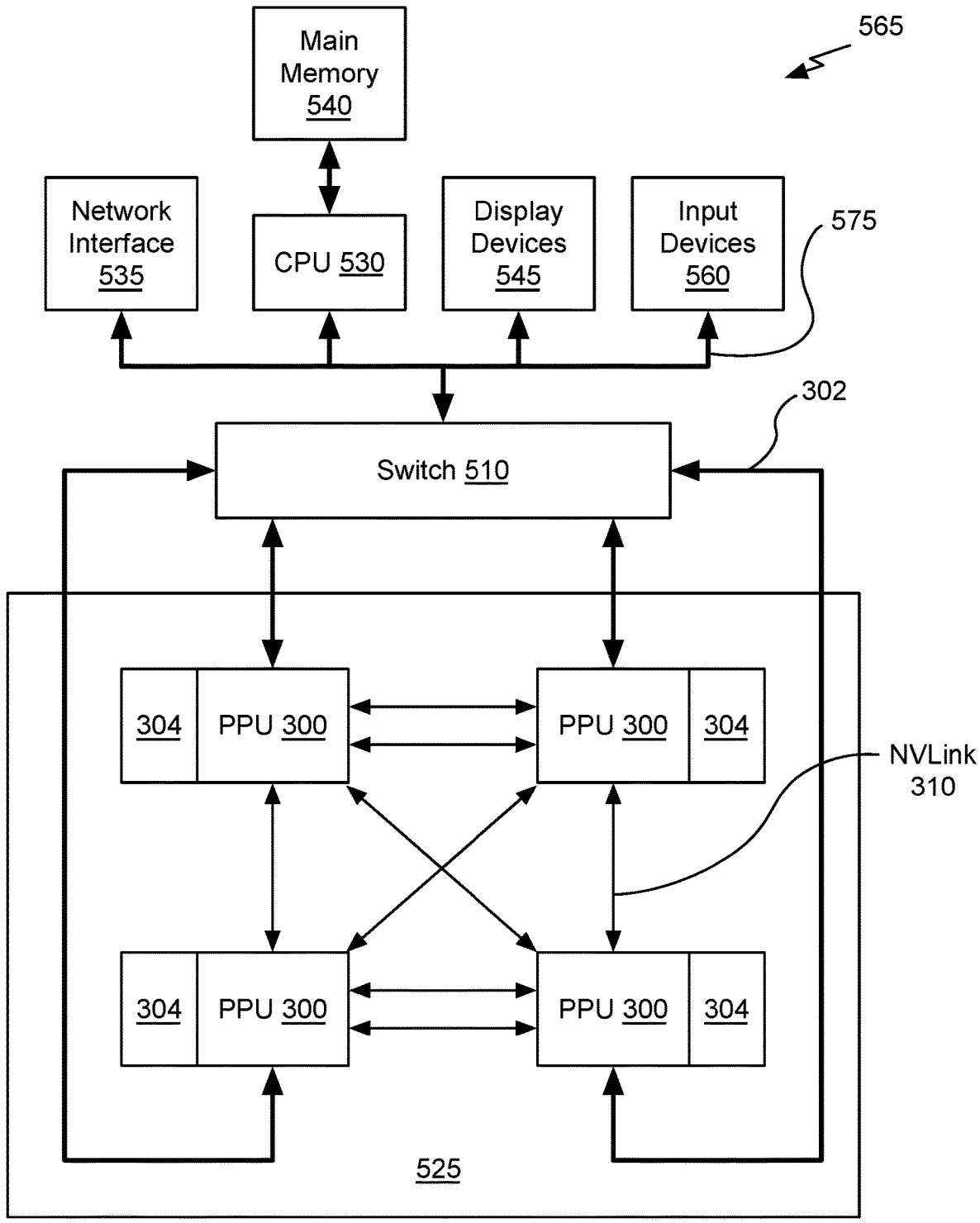
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 150 shown in FIG. 1 and/or the method 200 shown in FIG. 2A.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Figure 6:
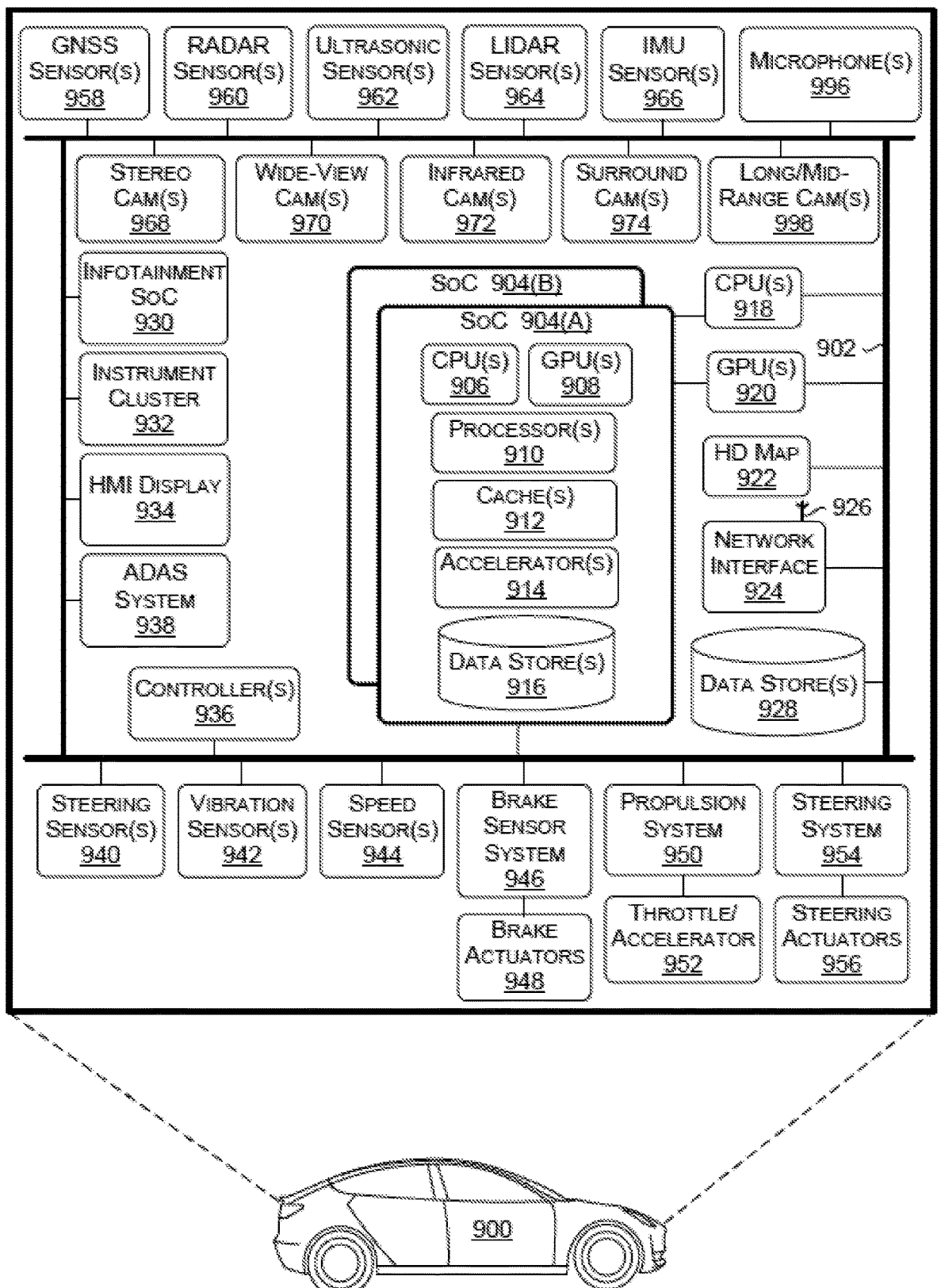
FIG. 6 is a block diagram of an example system architecture for an example autonomous vehicle, in accordance with an embodiment.

FIG. 6 is a block diagram of an example system architecture for an example autonomous vehicle 900, in accordance with an embodiment of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 6 are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 6. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers.

In at least one embodiment, one or more of the SoC(s) 904 may include one or more hardware components 102 (e.g., the CPU(s) 906, the GPU(s) 906, the processor(s) 910, the cache(s) 912, the accelerator(s) 914, and/or the data store(s) 916) and/or one or more degradation detection systems.

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 808 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g., from another subsystem), inertial measurement unit (IMU) sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS and/or assisted GPS sensors), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennas and a high-speed CAN and FlexRay interface. In an example with six antennas, the central four antennas may create a focused beam pattern, designed to record the vehicle's 900 surroundings at higher speeds with minimal interference from traffic in adjacent lanes. The other two antennas may expand the field of view, making it possible to quickly detect vehicles entering or leaving the vehicle's 900 lane.

Mid-range RADAR systems may include, as an example, a range of up to 860 m (front) or 80 m (rear), and a field of view of up to 42 degrees (front) or 850 degrees (rear). Short range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be functional safety level ASIL B. In some examples, the vehicle 900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 800 m, with an accuracy of 2 cm-3 cm, and with support for an 800 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to an 820-degree horizontal and 35-degree vertical field of view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

In at least one embodiment, any of the various one or more actions from the remedial action manager may be with respect to the ADAS system 938 and/or one or more of the above mentioned functionalities (e.g., indicators, disabling, logging, etc.).

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, WiFi, steering wheel audio controls, hands free voice control, a heads-up display (HUD), an HMI display 934, a telematics device, a control panel (e.g., for controlling and/or interacting with various components, features, and/or systems), and/or other components.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

In at least one embodiment, one or more indicators provided by the remedial action manager may be presented and/or displayed using one or more of the infotainment SoC 930, the instrument cluster 932, or the HMI display 934.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method comprising:
    executing at least a portion of a test comprising a first sequence of test patterns on a hardware component of an in-field computing platform to produce a first test result, wherein a first value is used for a physical operating parameter that is applied to the hardware component during execution of the test;
    storing the first test result in a memory by an in-system test (IST) controller within the in-field computing platform;
    updating, in response to a command generated by the IST controller, the physical operating parameter to use a second value that is based on the first test result;
    dynamically determining a second sequence of the test patterns to apply to the hardware component, wherein the second sequence includes at least one of the test patterns from the first sequence; and
    resuming execution of a second portion of the test comprising the second sequence of the test patterns on the hardware component using the second value for the physical operating parameter to produce a second test result.

2. The computer-implemented method of claim 1, wherein the physical operating parameter is at least one of:
    a supply voltage;
    a supply current;
    a clock speed;
    a noise magnitude;
    a noise duration; or
    a temperature.

3. The computer-implemented method of claim 1, wherein the second value is determined by the IST controller.

4. The computer-implemented method of claim 1, wherein the second value is determined by a central processing unit (CPU) that is coupled to the hardware component.

5. The computer-implemented method of claim 1, wherein the first test result indicates a pass and, further comprising, determining that the second value is a cutoff value for the physical operating parameter when the second test result indicates a failure.

6. The computer-implemented method of claim 1, wherein the test comprises at least one of:
    a permanent fault test; or
    a functional test.

7. The computer-implemented method of claim 6, wherein the test comprises a permanent fault test represented as one or more structural vectors.

8. The computer-implemented method of claim 6, wherein the test comprises a functional test represented as one or more functional vectors.

9. The computer-implemented method of claim 1, further comprising:
    waiting a pre-determined time duration after resuming execution of the test on the hardware component before checking the second test result; and
    rebooting the in-field computing platform when the pre-determined time duration expires and execution of the test is not complete.

10. The computer-implemented method of claim 1, wherein updating the physical operating parameter to use the second value comprises transmitting the command from the IST controller to an external component that provides the physical operating parameter to the hardware component.

11. The method of claim 1, wherein the second sequence is generated according to a search algorithm based on the first test result.

12. A system, comprising:
    an in-system test (IST) controller within an in-field computing platform and coupled to a memory and configured to:
    execute at least a portion of a test comprising a first sequence of test patterns on a hardware component of the in-field computing platform to produce a first test result, wherein a first value is used for a physical operating parameter that is applied to the hardware component during execution of the test;
    store the first test result in the memory by the IST controller;
    update, in response to a command generated by the IST controller, the physical operating parameter to use a second value that is based on the first test result;
    dynamically determine a second sequence of the test patterns to apply to the hardware component, wherein the second sequence includes at least one of the test patterns from the first sequence; and
    resume execution of a second portion of the test comprising the second sequence of the test patterns on the hardware component using the second value for the physical operating parameter to produce a second test result.

13. The system of claim 12, wherein the physical operating parameter is at least one of:
    a supply voltage;
    a supply current;
    a clock speed;
    a noise magnitude;
    a noise duration; or
    a temperature.

14. The system of claim 12, wherein the second value is determined by the IST controller.

15. The system of claim 12, wherein the first test result indicates a pass and, the IST controller is further configured to determine that the second value is a cutoff value for the physical operating parameter when the second test result indicates a failure.

16. The system of claim 12, wherein the IST controller is further configured to update the physical operating parameter to use the second value by transmitting the command to an external component that provides the physical operating parameter to the hardware component.

17. The system of claim 12, wherein the system comprises at least one of:
an autonomous or semi-autonomous vehicle;
an autonomous or semi-autonomous machine;
an autonomous or semi-autonomous industrial robot;
an autonomous or semi-autonomous robot;
a manned or unmanned aircraft; or
a manned or unmanned aquatic vessel.

18. The system of claim 12, wherein the system comprises at least one of:
a computing server system;
a data center;
a system-on-a chip (SoC); or
an embedded system.

19. A non-transitory computer-readable media storing computer instructions that, when executed by one or more processors, cause the one or more processors to perform the steps of:
executing at least a portion of a test comprising a first sequence of test patterns on a hardware component of an in-field computing platform to produce a first test result, wherein a first value is used for a physical operating parameter that is applied to the hardware component during execution of the test;
storing the first test result in a memory by an in-system test (IST) controller within the in-field computing platform;
updating, in response to a command generated by the IST controller, the physical operating parameter to use a second value that is based on the first test result;
dynamically determining a second sequence of the test patterns to apply to the hardware component, wherein the second sequence includes at least one of the test patterns from the first sequence; and
resuming execution of a second portion of the test comprising the second sequence of the test patterns on the hardware component using the second value for the physical operating parameter to produce a second test result.

20. The non-transitory computer-readable media of claim 19, wherein the physical operating parameter is at least one of:
a supply voltage;
a supply current;
a clock speed;
a noise magnitude;
a noise duration; or
a temperature.

21. The non-transitory computer-readable media of claim 19, wherein updating the physical operating parameter to use the second value comprises transmitting the command from the IST controller to an external component that provides the physical operating parameter to the hardware component.

* * * * *